United States Patent [19]
Keyes

[11] Patent Number: 5,308,504
[45] Date of Patent: May 3, 1994

[54] VISCOSITY BASED TANK LEVEL AND FLOW CONTROL SYSTEMS

[76] Inventor: Wilford W. Keyes, 609 Poinciana Dr., Gulf Breeze, Fla. 32561

[21] Appl. No.: 9,801

[22] Filed: Jan. 26, 1993

[51] Int. Cl.[5] .................. B01D 21/32; D21C 11/00
[52] U.S. Cl. ........................ 210/744; 162/29; 162/238; 162/252; 210/86; 210/138; 210/521; 210/803
[58] Field of Search .............. 137/492; 162/29, 30.1, 162/30.11, 198, 238.1, 239, 240, 263, DIG. 10, 252, 262; 210/85, 86, 96.1, 97, 103, 138, 109, 112, 115, 143, 242.1, 513, 521, 122, 776, 739, 740, 744, 800, 928, 141, 258, 803; 73/54.01; 208/391, DIG. 1; 417/12, 14, 253

[56] References Cited
U.S. PATENT DOCUMENTS

| | | | |
|---|---|---|---|
| 3,401,110 | 9/1968 | Floyd et al. | 208/391 |
| 3,530,042 | 9/1970 | Graybill et al. | 208/391 |
| 4,931,175 | 6/1990 | Krofta | 210/86 |
| 5,137,643 | 8/1992 | Keyes et al. | 210/776 |

FOREIGN PATENT DOCUMENTS

| | | | |
|---|---|---|---|
| 1321603 | 6/1973 | United Kingdom | 137/4 |
| 2157584 | 10/1985 | United Kingdom | 210/739 |

OTHER PUBLICATIONS

FCI Fluid Components, Inc. Brochure, Document No. 11164-B-"Liquid Level/Interface Detection" (Temperature Detectors).
Dynatrol TM Level Switch For Bulk Solids, Automation Products, Inc., Bulletin No. DJ69, (Model No. CL-10DJ).

Primary Examiner—Joseph W. Drodge

[57] ABSTRACT

Tank level and flow control systems wherein the presence of materials or solutions of known viscosity ranges in a tank or flow stream is detected by using viscosity detection devices. Automatic control devices are also incorporated into these systems to react to one or more signals from the viscosity detection devices and to control the operation of a pump and appropriate valves. One embodiment of the tank level and control system includes a viscosity detection system using a vertical three probe arrangement to report relative viscosities of materials in a storage tank, at predetermined levels in the tank, to the control device.

9 Claims, 4 Drawing Sheets

VISCOSITY BASED TANK LEVEL AND FLOW CONTROL SYSTEMS

BACKGROUND

The pulp and paper industry is replete with instances where tank level and flow control systems are needed to ensure the proper control of, for example, material balances in the paper mill and to ensure against the environmental concerns of spills and inefficient blending of process materials. One such example of this need relates to the kraft papermaking operations around the world, and specifically to the byproduct operations in the kraft mill. In particular, the kraft papermaking process involves the production of a spent caustic solution (or weak black liquor) as a byproduct of the digester operation (where wood chips, for example, are broken down to cellulose fibers by the application of steam, pressure and chemicals). This spent caustic solution, after further concentration (to increase the percentage solids in the solution) and when stored in some tank arrangement, forms a precipitate called sulfate soap which, having a lower density than the weak black liquor, floats on the weak black liquor solution in the tank.

It is the flow and control of the sulfate soap and the weak black liquor which is the focus of the present invention. More specifically, the weak black liquor in a kraft papermill is usually processed further in the mill evaporators and used as a source of energy for the mill. If the mill evaporators are provided with a source of black liquor which has a high concentration of sulfate soap, the evaporator operation will be significantly less efficient than desired and in some instances may present serious environmental hazards.

The sulfate soap is also processed further, usually by acidulation, wherein the sulfate soap is blended with the appropriate amount of an acid, typically sulfuric acid, to produce a waste brine solution having a low pH, and a tall oil product. The presence of higher than optimal levels of weak black liquor in the sulfate soap may lead to higher costs for acidulation, unacidulated soap, and a host of environmental concerns related to the disposal of the higher levels of acid/brine solution.

In order to optimize the removal of the sulfate soap from the weak black liquor without removing an unnecessarily large amount of the weak black liquor along with the sulfate soap, tank level and flow controls for this portion of the papermill must be carefully controlled.

Figure 1:
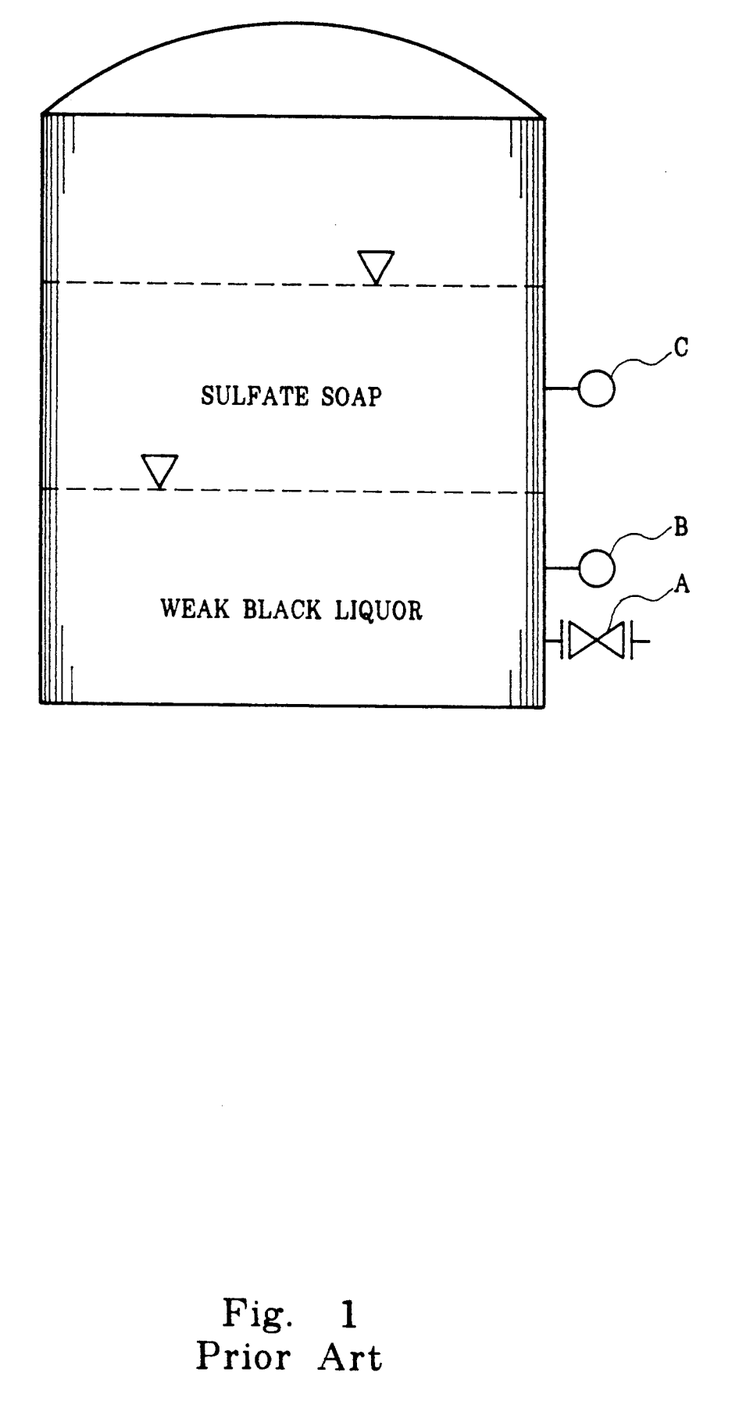
FIG. 1 is a diagrammatic illustration representing a prior art sulfate soap storage tank arrangement including a tank level and flow control system for sulfate soap and weak black liquor.

Referring to FIG. 1, representing a prior art storage tank arrangement for sulfate soap and weak black liquor, the mixture of weak black liquor and sulfate soap was sent to a tank where the sulfate soap would rise to the top of the mixture and the weak black liquor would become the lower layer in the tank. The creation of the mixture of weak black liquor and sulfate soap is the result of the reaction of the caustic pulping liquor solution with the wood chips in the digester. The separated sulfate soap phase must be first skimmed from the mixture (while still in one or more weak black liquor tanks) to remove the bulk of the precipitated sulfate soap. This skimming operation involves the removal of the precipitated sulfate soap and some of the weak black liquor. The "skimmed" portion of the weak black liquor tanks is then typically transferred to one or more sulfate soap storage tanks where the weak black liquor and the sulfate soap undergo further separation.

In reality, the separation of the components in the tank occurs in accordance with a density gradient with the lighter soap material rising to the top of the tank and the heavier weak black liquor material sinking to the bottom of the tank. It is normal for the sulfate soap in the top portion of the sulfate soap storage tank to contain a lower percentage of black liquor than the sulfate soap toward, for example, the middle of the tank. This separation of the weak black liquor and sulfate soap occurs because of the different densities of the two components of this mixture. In particular, the weak black liquor by itself, has a typical density range of 8.8 pounds per gallon to 9.3 pounds per gallon, while the sulfate soap, depending upon the amount of entrained air and weak black liquor, may have a typical density range of from 2 pounds per gallon to 8 pounds per gallon. Also, weak black liquor is a relatively free flowing, non-viscous material when compared to sulfate soap, which, depending upon the percentage of entrained weak black liquor, is a relatively viscous material. In fact, sulfate soap can typically have a viscosity range of approximately 2000 centipoise to 5000 centipoise, while weak black liquor, depending upon the amount of solids in the solution, has a typical viscosity range of 1 centipoise to 3 centipoise.

In the past, for example, and referring to FIG. 1, an operator would manually open a valve A at the bottom of the tank to remove the accumulated weak black liquor and either visually inspect the flow of material from the open valve, or approximate the amount of weak black liquor in the tank and keep the valve open for the correct amount of time to remove the weak black liquor. Other attempts at performing this operation included the use of temperature detection devices B and C, based on the differentials in the thermal conductivity characteristics of the weak black liquor and sulfate soap components. This procedure in particular has proven to be ineffective due to varying component composition and fouling of the temperature probes B and C in the weak black liquor and sulfate soap solutions, respectively, causing frequent cleanings and unreliable readings of tank levels.

Prior to the present invention, attempts to use viscosity detection as a means to determine the sulfate soap and weak black liquor interfaces in a tank failed because of the inability of such systems to accommodate the full range of flow conditions in the tank. Specifically, the former attempts failed to address the ever present process conditions relating to the high variability of process physical parameters and chemical composition.

SUMMARY OF THE INVENTION

The tank level and flow control systems of the present invention includes a method and apparatus for automatically controlling the flow of heavy phase and light phase components from a mixture of solutions having known density and viscosity characteristics. Specifically, the present invention employs viscosity detection as the principal means for determining when the respective components of a mixture of heavy phase and light phase solution flow out of a storage tank which receives the mixture at varying flowrates and relative percentages of heavy phase and light phase solutions.

Figure 2:
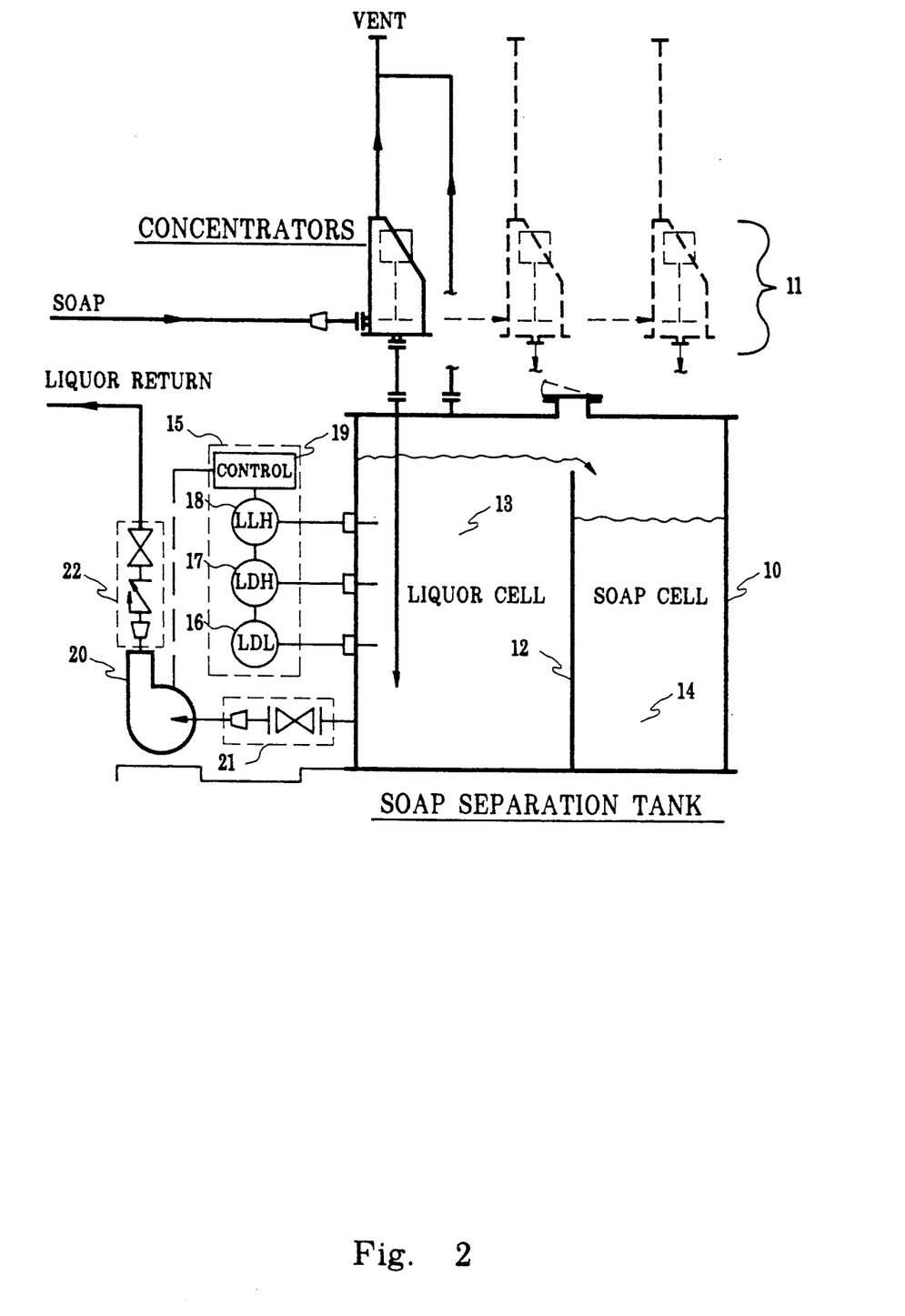
FIG. 2 is a diagrammatic illustration of the tank level control system of the present invention including viscosity detection probes.

In one embodiment, illustrated in FIG. 2, the tank level and flow control system involves a storage tank, designed to hold a mixture of heavy phase and light phase solutions, in which three viscosity detection devices are mounted to determine relative viscosities for the mixture at predetermined levels in the tank. The information relating to these viscosities is then fed to a control device which determines when, and if, to turn on or off a heavy phase takeaway pump. The tank level and flow control system also recognizes transitions in viscosity levels at the three probes and includes those transitions in its decisions to turn on or off the pump.

Figure 3:
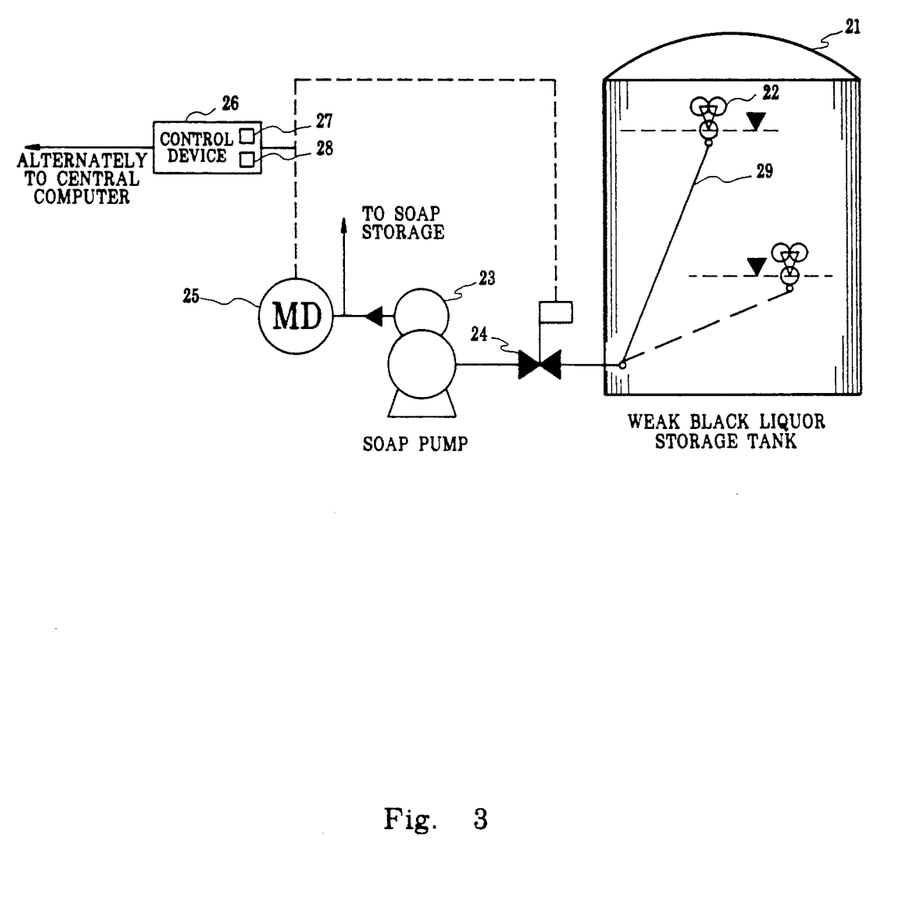
FIG. 3 is a diagrammatic illustration of a sulfate soap flow control system in accordance with the present invention, including a viscosity detection probe.

In another embodiment of the present invention, illustrated in FIG. 3, a viscosity detection device is mounted on the discharge side of a light phase pump which removes the light phase component of the mixture from a storage tank, usually through a skimmer device. The viscosity detection device transmits a viscosity signal to a control device which determines when, and if, to start or stop the pump. The control device includes at least two timer devices, a first timer device to allow the flow path between the skimmer and the pump to be cleared of accumulated mixture before considering viscosity detection signals and a second timer to allow light phase material to accumulate in the tank, before starting the pump again.

Figure 4:
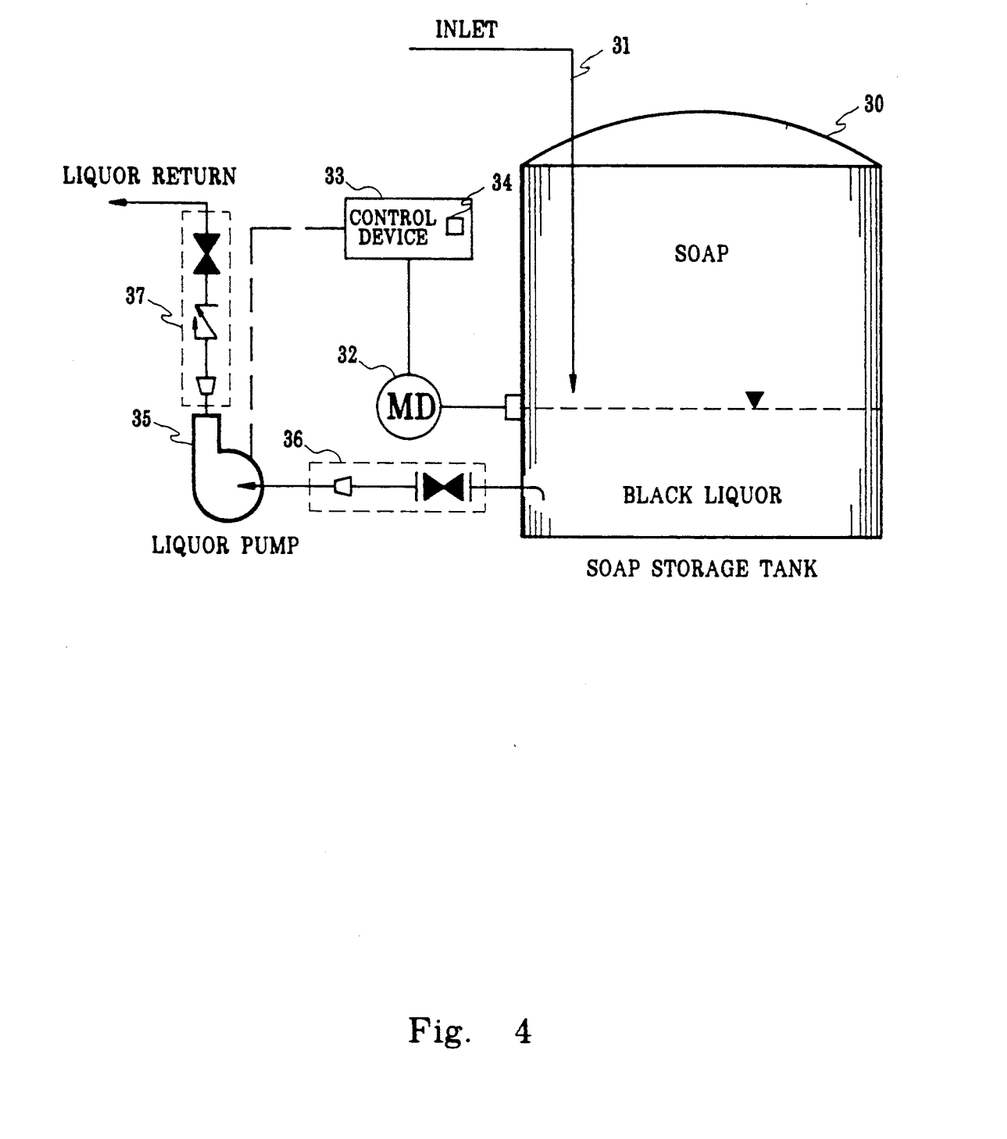
FIG. 4 is a diagrammatic illustration of a weak black liquor flow control system in accordance with the present invention, including a viscosity detection probe.

In another embodiment of the present invention, illustrated in FIG. 4, a viscosity detection device is mounted in the storage tank at a predetermined level. The viscosity detection device transmits a viscosity signal to a control device which determines when, and if, to start or stop a heavy phase pump which removes the heavy phase component of the mixture from the storage tank. The control device in this instance includes a timer device to allow for a specific volume of heavy phase solution to be pumped before stopping the pump.

In each of the embodiments above, the tank level and flow control system of the present invention, provides for a flexible system for automatically handling variable flows to the storage tank and variable relative volumetric percentages of heavy phase and light phase components in the mixture held in the storage tank.

DETAIL DESCRIPTION OF THE PREFERRED EMBODIMENT

Referring to FIG. 2, a sulfate soap separation/storage tank 10 is arranged to hold a mixture of weak black liquor and sulfate soap. The storage tank 10 is placed in a sulfate soap handing system of a kraft papermill after one or more sulfate soap concentrators 11, such as those manufactured by A. H. Lundberg & Co. The sulfate soap concentrators 11 are used to concentrate the sulfate soap stream by removing the entrained air. Typically, these concentrators 11 increase the density of the sulfate soap from approximately 1 pound per gallon to approximately 8 pounds per gallon.

The concentrated soap is then fed to the storage tank 10 which may contain a baffle 12 to facilitate the separation of the sulfate soap from the weak black liquor. The baffle 12, is intended to divide the storage tank 10 into a liquor cell 13 (actually a mix of sulfate soap and black liquor) and a soap cell 14, and when employed properly, allows sulfate soap having, relatively, the least amount of black liquor to flow over the baffle 12 into the soap cell portion 14 of the tank. Alternatively, the baffle 12 may be replaced with a two tank arrangement wherein the first tank simply overflows primarily sulfate soap into the second tank or, an arrangement involving more than one tank, and a floating skimmer device, discussed in more detail below.

It is common for the liquor cell 13 to contain primarily weak black liquor with a layer of precipitated sulfate soap on top of it. The relative makeup of the liquor cell 13, in terms of the amount of weak black liquor and sulfate soap, is constantly changing and must be controlled to ensure that the "best" sulfate soap (soap with the appropriate amount of entrained weak black liquor) flows over the baffle 12 into the soap cell 14. The amount of sulfate soap which flows into the liquor cell 13 of the soap storage tank 10 depends upon a variety of factors including the type of wood chips processed, the efficiency of the mill's byproduct recovery system and the efficiency of the soap skimming and soap concentration equipment.

The weak black liquor/sulfate soap mixture being unpredictable requires that the tank level and flow control system be flexible enough to handle wide swings in the relative volumetric percentages of weak black liquor to sulfate soap entering the sulfate soap storage tank 10. The present invention provides the flexibility needed in the sulfate soap storage and handling system of a kraft papermill through, for example, the use of a three probe viscosity detection system 15.

The three probe viscosity detection system 15 comprises three viscosity detection probes 16, 17, and 18. Each of the viscosity detection probes 16, 17, and 18 of the present invention is a detection device capable of determining the level of liquids, slurries or gas in a tank, such as the Dynatrol CL-10DJ level detector or CL-IORH series of level detectors.

In accordance with the present invention, the first of these viscosity detection probes is a weak black liquor low level probe 16. This low detection level ("LDL") probe 16 is installed in the tank 10 at a predetermined minimum weak black liquor level, which is chosen in dependence upon the size of the sulfate soap storage tank 10 and the estimated flows of weak black liquor/sulfate soap mixture to the soap handing system of the papermill. The second of these viscosity probes 16, 17 and 18 is a weak black liquor high level probe 17. This high detection level ("LDH") probe 17 is installed in the tank 10 at a predetermined maximum weak black liquor level. The third viscosity detection probe of the present invention is a sulfate soap/air detection probe 18. This high level ("LHH") probe 18 is installed in the tank 10 at a predetermined level above the weak black liquor high level probe 17 to ensure that either sulfate soap or weak black liquor covers each of the weak black liquor low level probe 16 and the weak black liquor high level probe 17 at all times. The appropriate positioning of the sulfate soap/air detection probe 18 relative to the weak black liquor high level probe 17 is about twelve inches above it. Of course, the positioning of the sulfate soap/air detection probe la will ultimately depend upon the amount of sulfate soap and weak black liquor for a particular papermill. Twelve inches has been found to be satisfactory for most United States applications and corresponds to the sulfate soap layer on top of the weak black liquor solution.

The three probe viscosity detection system 15 further comprises a controller device 19 which is adapted to receive a signal from each of the three viscosity detection probes 16, 17, and 18. This controller device 19 may comprise a programmable controller, a papermill computer system or discrete electrical hardware components arranged to receive inputs from the respective viscosity detection probes 16, 17, and 18 and to react to those inputs in the appropriate manner to ensure the correct implementation of the tank level and flow control system of the present invention. It should also be noted that the controller device 19 may also be arranged to provide some indication of the inputs received from the three viscosity detection probes 16, 17, and 18, such as, for example, an alarm, indicator light or other display, to enable an operator to manually control the tank level and flow control system of the present invention.

The controller device 19 controls the operation of a pump 20 which is typically positioned adjacent to the storage tank 10. The pump 20 may comprise a positive displacement or centrifugal pump capable of operating over a range of product viscosities and flow rates. This pump 20 may be equipped with a variable speed drive motor in cases where it is desirable to control the flow of the pump 20 without turning the motor off. The tank level and flow control system of the present invention may also provide for the pump 20 to be placed physically outside the storage tank 10 and also between the tank 10 and an appropriate arrangement of throttle and control valves 21. In addition, the pump 20 may also be placed just before an appropriate arrangement of isolation and check valves 22.

The tank level and flow control system of the present invention operates in the following manner. The weak black liquor high level probe 17 ("middle" probe of the three probe arrangement) is responsible for providing the signal which turns on the pump 20. Specifically, when the middle probe 17 detects a transition from a high viscosity material (sulfate soap) to a low viscosity material (weak black liquor), the controller device 19 reacts by turning on the pump 20. This is an indication that the weak black liquor solution has risen in the liquor cell 13 of the storage tank 10 to a level which warrants the pumping out of the accumulated weak black liquor in the liquor cell 13. Of course, whenever the middle probe 17 is immersed in weak black liquor, the weak black liquor low level probe 16 ("bottom" probe in the three probe arrangement) must also be immersed in weak black liquor. The tank level and flow control system of the present invention may be adapted to check the viscosity detected by the bottom probe 16 prior to allowing the pump 20 to be turned on.

The bottom probe 16 is responsible for providing the signal which turns off the pump 20. Specifically, when the bottom probe 16 detects a transition from low viscosity (weak black liquor) to high viscosity (sulfate soap), the controller device 19 reacts by turning off the pump 20. This transition is an indication of the level of weak black liquor falling below the bottom probe 16. Since, in this case, the sulfate soap is a valuable component, the system ensures that no sulfate soap is lost by allowing the pump 20 to continue to run after an indication of low weak black liquor level.

The sulfate soap/air detection probe 18 ("top" probe in the three probe arrangement) is responsible for providing the signal to the controller device 19 which turns the pump 20 off when it detects a transition from high viscosity material (sulfate soap) to very low viscosity material (air). The tank level and flow control system of the present invention is also adapted to ensure that the only high viscosity to very low viscosity transition that the top probe 18 may detect is the transition from sulfate soap to air, rather than from sulfate soap to weak black liquor (also having a low viscosity). This is accomplished by providing for the controller device 19 to check the viscosity detected by the middle probe 17 to ensure that when the top probe 18 has indicated a transition from high viscosity to very low viscosity, the middle probe 17 provides a signal corresponding to a high viscosity (sulfate soap). This arrangement is to protect against the potential for the top probe 18 to detect a low viscosity, causing the controller device 19 to shut down the pump 20, when the low viscosity corresponds to weak black liquor instead of air. Of course, the above scenario is unlikely in the context of the present invention since, in order for the top probe 18 to detect a low viscosity corresponding to weak black liquor, the middle and bottom probes, 17 and 16 respectively, would also have to be immersed in weak black liquor, resulting in the controller device 19 turning on the pump 20 to drain the weak black liquor from the liquor cell 13.

Referring now to FIG. 3, the tank level and flow control system of the present invention may include one or more storage tanks 21 without baffles. As such, the light phase material, or sulfate soap, would be removed by some skimming apparatus 22 rather than by gravity overflow as depicted in FIG. 2. An appropriate skimming device is described in detail in U.S. Pat. No. 5,137,643, entitled "CONTINUOUS SOAP SKIMMER," and is incorporated by reference herein for the purposes of background and understanding.

In the arrangement involving a non-baffled storage tank 21 as shown in FIG. 3, a light phase pump 23 is used to remove the light phase material (sulfate soap) which is skimmed by the skimmer device 22. This pump 23 may comprise a positive displacement pump or other such device to remove the light phase material (sulfate soap) or weak black liquor which may enter the skimming device 22. An automatic control valve 24 may also be installed on the suction side of the light phase pump 23 and is arranged to allow the free flow of sulfate soap during pumping operations and to prevent the siphoning of weak black liquor once the sulfate soap is skimmed from the tank 21. The automatic control valve 24 includes the valve itself, an air operated actuator, and an electric or air solenoid valve as known in the art.

A material sensing probe 25 (or material detector "MD") is installed on the discharge side of the light phase pump 23, preferably in a horizontal run of a pipe elbow connected to the discharge side of the pump 23. This material sensing probe 25 comprises a viscosity detection device as described above for the viscosity detection probes 16, 17 and 18. This probe 25 is used to detect the viscosity of the material in the pipe at the discharge side of the pump 23 and to provide an indication of that viscosity to a control device 26. The control device 26 may comprise a programmable controller, a papermill computer system or discrete electrical hardware components arranged to receive inputs from the material sensing probe 25.

The control device 26 operates to receive a signal from the material sensing probe 25 and react to that signal by either turning the pump 23 on or off, or by allowing the pump 23 to continue to run. It should also be noted that the control device 26 may also be arranged to provide some indication of the input received from the material sensing probe 25, such as, for example, an alarm, indicator light or other display, to enable an operator to manually control the system of the present invention. The control device 26 may further comprise a short cycle timer device 27 and a long cycle timer 28 each of whose operation will be described below.

When the flow control system of the present invention is put into operation, the control device 26 turns on the pump 23 and opens the automatic valve 24 to allow the free flow of material from the skimmer device 22 to enter the suction side of the pump 23. The control device 26 also initiates the short cycle timer 27 which allows the pump 23 to operate for the entire time which is preset into the short cycle timer 27. The short cycle timer 27 is intended to allow the contents of the soap flow pipe 29 between the skimmer device 22 and the pump 23 to be displaced by "new" material skimmed by skimmer device 22. The preset time for this timer 27 therefore is determined by the length and flow area of the soap flow pipe 29 and any other piping between the skimmer device 22 and the pump 23. The preferred range of preset times for the short cycle timer 27 are from one to ten minutes.

When the short cycle timer 27 times out, the control device 26 checks the signal received from the material sensing probe 25. If the signal received from the material sensing probe 25 corresponds to a predetermined low viscosity material (weak black liquor), the control device 26 turns the pump 23 off and returns the automatic control valve 24 to its closed position. A sensing of low viscosity by the material sensing probe 25 would be indicative of a condition in the tank 21 of the skimmer device 22 skimming weak black liquor instead of sulfate soap (having a higher viscosity). This further indicates a low volume light phase (sulfate soap) condition, meaning that the system must be provided with sufficient time to allow light phase material to accumulate in the tank 21.

When the control device 26 shuts the pump 23 down after the material sensing probe 25 detecting low viscosity, it initiates the long cycle timer 28. The long cycle timer 28 is preset to a predetermined time to allow the light phase material to accumulate in the tank 21. The preferred time for this timer 28 will depend upon the specifics of the papermill involved, including the amount of pulping being conducted, the size of the storage tank 21 and other factors. Experience has shown that the time needed for a tank to accumulate enough light phase material to continue operation is approximately six to twenty four hours.

If the control device 26 receives a signal from the material sensing probe corresponding to high viscosity material (sulfate soap), it will allow the pump 23 to continue to operate until it receives a signal from the material sensing probe indicative of a transition from high viscosity material to low viscosity material. When such a transition is detected, the control device 26 turns the pump 23 off, returns the automatic control valve 24 to its closed position, and initiates the long cycle timer 28.

Referring now to FIG. 4, the tank level and flow control system of the present invention may further comprise a weak black liquor removal system including a sulfate soap storage tank 30 having a soap inlet pipe 31 which may extend into the tank 30 to a point near the sulfate soap/weak black liquor interface. This sulfate soap storage tank 30 is intended to accept the sulfate soap which is either skimmed from the non-baffled tank shown in FIG. 3, or which is allowed to overflow the baffle as shown in FIG. 2. In either case, when sulfate soap is stored in a tank, the residual weak black liquor will settle out of the sulfate soap and rest in the bottom of the storage tank 30. In order to maintain the minimum level of weak black liquor in the storage tank 30, the tank level and flow control system of the present invention provides for this material to be removed.

Specifically, the storage tank 30 is equipped with a viscosity detection probe 32 (or material detector "MD"). This viscosity detection probe 32, like the viscosity detection probes 16, 17, and 18 described above, is capable of determining the viscosity of the material in the tank 30 at a predetermined level in the tank 30. The viscosity detection probe 32 transmits a signal to a control device 33 which is adapted to receive such signal and to react to the indication of the viscosity of the material in the tank 30 at the predetermined level. The control device 33 may comprise a programmable controller, a papermill computer system or discrete electrical hardware components arranged to receive inputs from the viscosity detection probe 32. The control device 33 may further comprise a cycle timer device 34 whose operation will be described below. It should also be noted that the control device 33 may also be arranged to provide some indication of the signal received from the viscosity detection probe 32, such as, for example, an alarm, indicator light or other display, to enable an operator to manually control the weak black liquor level in the storage tank 30.

The weak black liquor removal system shown in FIG. 4 also includes a heavy phase pump 35 (or liquor pump) adapted to remove the accumulated weak black liquor in the bottom of the storage tank 30. This pump 35, like those earlier described, may comprise a positive displacement type (e.g., lobe rotor pump) or a centrifugal pump capable of removing material within a range of product viscosities and flow rates.

The liquor pump 35 is typically positioned outside of the storage tank 30 following an appropriate arrangement of valving 36 including at least an automatic isolation valve. In addition, the liquor pump 35 may also be placed before another appropriate arrangement of valving 37 including at least an isolation valve and a check valve.

The weak black liquor removal system of the present invention operates in the following manner. The system is turned on and the viscosity detection probe 32 determines the viscosity of the material in the storage tank 30 at the predetermined level. If the viscosity detection probe 32 transmits a signal to the control device 33 indicative of a material having a high relative viscosity (sulfate soap), the control device 33 simply continues to monitor the signal received from the viscosity detection probe 32. If the viscosity detection probe 32 transmitted a signal indicative of a low relative viscosity (weak black liquor), the control device 33 would provide for the liquor pump 35 to be turned on and to continue to pump until such time as the viscosity detection probe 32 detects a transition from a low viscosity solution (weak black liquor) to a high viscosity solution (sulfate soap). At this point, the control device 33 provides for the liquor pump 35 to continue pumping low viscosity material (weak black liquor) for a specific preset period of time. At the end of this period of time the cycle timer device 34 will stop the pump 35 and reset itself for the next cycle. The pump 35 will be restarted when the control device 33 receives a signal from the viscosity detection probe 32 indicative of a transition from sulfate soap to weak black liquor. This allows for the accumulation of weak black liquor in the bottom of the tank 30 and reduces the amount of starts and stops for the liquor pump 35. The length of the cycle timer device 34 depends upon the size of the storage tank 30 and other process factors.

In view of the foregoing disclosure it is evident that the tank level and flow control system of the present invention is applicable to more than the papermill by-product recovery processes described. In fact, the present invention may be employed in any storage tank arrangement involving materials having relatively different viscosities wherein one or more control devices may discriminate between the materials.

What is claimed is:

1. A storage tank level and flow control system comprising:
    a storage tank for storing a mixture of at least a heavy phase solution, having a known first viscosity range and a known first density range, and a light phase solution having a known second viscosity range and a known second density range, and wherein the mixture of said heavy and light phase solutions forms a top layer of substantially light phase solution and a bottom layer of substantially heavy phase solution in accordance with the known first and second density ranges;
    a heavy phase pump arranged to remove said bottom layer from said storage tank; and
    a viscosity detection and control system comprising a low level viscosity probe, a middle level viscosity probe a top level viscosity probe and an automatic control device,
        said low level viscosity probe being mounted at a predetermined first level in said storage tank, and adapted to detect the viscosity of the solutions present in said storage tank at said predetermined first level and transmit a first signal to said control device corresponding to the viscosity detected at said predetermined first level;
        said middle level viscosity probe being mounted at a predetermined second level above said predetermined first level in said storage tank and adapted to detect the viscosity of the solutions present in said storage tank at said predetermined second level and transmit a second signal to said control device corresponding to the viscosity detected at said predetermined second level;
        said top level viscosity probe being mounted at a predetermined third level above said predetermined second level in said storage tank and adapted to detect the viscosity of the solutions present in said storage tank at said predetermined third level and transmit a third signal to said control device corresponding to the viscosity detected at said predetermined third level; and
        said control device adapted to receive said first, second and third signals and to automatically control the state of said heavy phase pump in dependence upon the received first, second and third signals,
    wherein said storage tank control system is capable of removing accumulated said heavy phase solution and adapting to varying flow conditions of the mixture to said storage tank and varying storage tank levels for each of said heavy phase and light phase solution in the mixture.

2. The storage tank level control system of claim 1, wherein said control device operates to:
    turn on said heavy phase pump when receiving of said second signal indicates a transition from said second viscosity range to said first viscosity range;
    turn off said heavy phase pump when receiving of said first signal indicates a transition from said first viscosity range to said second viscosity range; and
    turn off said heavy phase pump when receiving of said third signal indicates a transition from said second viscosity range to said first viscosity range.

3. The storage tank level control system of claim 1, wherein said storage tank further comprises a baffle, dividing said storage tank into first and second portions and providing for said light phase solution to overflow by gravity from said first portion to said second portion.

4. A storage tank and flow control system comprising:
    a storage tank for storing a mixture of at least a heavy phase solution, having a known first viscosity range and a known first density range and a light phase solution, having a known second viscosity range and a known second density range, and wherein the mixture of said heavy and light phase solutions forms a top layer of substantially light phase solution and a bottom layer of substantially heavy phase solution in accordance with the known first and second density ranges;
    a heavy phase pump arranged to pump said bottom layer from said storage tank; and
    a viscosity detection and control system comprising a viscosity probe and a control device, said viscosity probe being mounted at a predetermined tank level in said storage tank and adapted to detect the viscosity of the solutions present in said storage tank at said predetermined tank level and transmit viscosity signals to said control device corresponding to the viscosity detected at said predetermined tank level, said control device further comprising a cycle timer device adapted to provide said control device with a predetermined delay, said control device further adapted to receive said viscosity signals and to:
    a) monitor said viscosity signals,
    b) turn on said heavy phase pump when said received viscosity signals correspond to said first viscosity range,
    c) turn off said heavy phase pump after a preset period of time commencing when said received viscosity signals indicate a transition from said first viscosity range to said viscosity range,
    d) after said predetermined delay, the cycle timer device will reset itself for the next cycle,
    wherein said storage tank level of flow control system is capable of removing accumulated heavy phase solution and is further capable of adapting to varying flow conditions of the mixture to said storage tank and varying storage tank levels for each of said heavy phase and light phase solutions in the mixture.

5. A method of controlling tank levels in a storage tank, comprising the steps of:

storing a mixture of at least a heavy phase solution, having a known first viscosity range and a known first density range, and a light phase solution having a known second viscosity range and a known second density range;

forming from the mixture a top layer of substantially light phase solution and a bottom layer of substantially heavy phase solution;

detecting the viscosity of the solutions present at a predetermined first level in the tank;

transmitting a first signal to a control device corresponding to the viscosity detected at the predetermined first level in the tank;

detecting the viscosity of the solutions present at a predetermined second level in the tank, the second level being situated above the predetermined first level;

transmitting a second signal to the control device corresponding to the viscosity detected at the predetermined second level in the tank;

detecting the viscosity of the solutions present at a predetermined third level in the tank, the third level being situated above the predetermined second level;

transmitting a third signal to the control device corresponding to the viscosity detected at the predetermined third level in the tank;

receiving the first, second and third signals in the control device; and operating a pump to remove the bottom layer from the storage tank in dependence upon the viscosities detected at the first, second and third predetermined levels in the tank.

6. The method of claim 5, wherein the step of receiving the first, second and third signals in the control device includes the step of adapting the control device to recognize changes in the level of heavy phase solution in the storage tank.

7. The method of claim 5, wherein the step of receiving the first, second and third signals in the control device includes the step of programming the control device to react in a predetermined manner to changes in the respective levels of heavy phase and light phase solutions in the storage tank.

8. The method of claim 7, wherein the step of programming the control device further includes the steps of:

turning on the pump when receiving of the second signal indicates a transition from the second viscosity range to the first viscosity range;

turning off the pump when receiving of the first signal indicates a transition from the first viscosity range to the second viscosity range; and turning off the pump when receiving of the third signal indicates a transition from the second viscosity range to the first viscosity range.

9. A method of controlling tank levels in a storage tank, comprising the steps of:

storing a mixture of at least a heavy phase solution, having a known first viscosity range and a known first density range, and light phase solution having a known second viscosity range and a known second density range;

forming from the mixture a top layer of substantially light phase solution and a bottom layer of substantially heavy phase solution;

detecting the viscosity of the solution present at a predetermined level in the tank;

transmitting viscosity signals to a control device corresponding to the viscosity detected at the predetermined level in the tank;

receiving the viscosity signals in the control device;

operating the control device upon receiving the viscosity signals, to perform the steps of:

monitoring the viscosity signal;

detecting when the viscosity signal corresponds to the first viscosity range;

turning on a heavy phase pump when the viscosity signals correspond to the first viscosity range; and turning off the heavy phase pump after a preset period of time commencing when the viscosity signals indicate a transition from the first viscosity range to the second viscosity range; and resetting the cycle timer when the heavy phase pump is turned off by the control device.

* * * * *